US010100237B2

(12) United States Patent
Lipscomb et al.

(10) Patent No.: US 10,100,237 B2
(45) Date of Patent: Oct. 16, 2018

(54) ACRYLATE ADHESIVE WITH VINYLSILANE CROSSLINKING AGENTS

(71) Applicant: 3M INNOVATIVE PROPERTIES COMPANY, St. Paul, MN (US)

(72) Inventors: Corinne E. Lipscomb, St. Paul, MN (US); Kevin M. Lewandowski, Inver Grove Heights, MN (US); Carla S. Thomas, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 31 days.

(21) Appl. No.: 15/326,696

(22) PCT Filed: Aug. 31, 2015

(86) PCT No.: PCT/US2015/047648
§ 371 (c)(1),
(2) Date: Jan. 17, 2017

(87) PCT Pub. No.: WO2016/036634
PCT Pub. Date: Mar. 10, 2016

(65) Prior Publication Data
US 2017/0210954 A1    Jul. 27, 2017

Related U.S. Application Data

(60) Provisional application No. 62/044,542, filed on Sep. 2, 2014.

(51) Int. Cl.
*C09J 143/04* (2006.01)
*C08G 77/20* (2006.01)
*C08F 220/18* (2006.01)
*C09J 7/38* (2018.01)

(52) U.S. Cl.
CPC .......... *C09J 143/04* (2013.01); *C08F 220/18* (2013.01); *C08G 77/20* (2013.01); *C09J 7/38* (2018.01); *C09J 7/385* (2018.01); *C08F 2220/1858* (2013.01); *C08G 2170/40* (2013.01); *C09J 2205/114* (2013.01); *C09J 2433/00* (2013.01); *C09J 2483/00* (2013.01)

(58) Field of Classification Search
None
See application file for complete search history.

(56) References Cited

U.S. PATENT DOCUMENTS

| | | | |
|---|---|---|---|
| 2,716,638 A * | 8/1955 | Ladd | C07F 7/0849 174/76 |
| 4,234,662 A | 11/1980 | Pastor | |
| 4,415,615 A | 11/1983 | Esmay | |
| 5,276,110 A | 1/1994 | Zhou | |
| 5,416,127 A | 5/1995 | Chandran | |
| 5,506,279 A | 4/1996 | Babu | |
| 5,514,730 A | 5/1996 | Mazurek | |
| 5,534,391 A | 7/1996 | Wang | |
| 5,602,221 A | 2/1997 | Bennett | |
| 5,605,999 A | 2/1997 | Chu | |
| 5,741,543 A | 4/1998 | Winslow | |
| 5,902,836 A | 5/1999 | Bennett | |
| 6,852,781 B2 | 2/2005 | Savu | |
| 6,893,731 B2 | 5/2005 | Kausch | |
| 7,385,020 B2 | 6/2008 | Anderson | |
| 8,282,872 B2 | 10/2012 | Fujita | |
| 2004/0021254 A1 * | 2/2004 | Sreenivasan | B29C 35/0888 264/406 |
| 2007/0087206 A1 | 4/2007 | Soutar | |
| 2010/0004416 A1 * | 1/2010 | Neffgen | A61K 6/083 526/328.5 |
| 2010/0240831 A1 * | 9/2010 | Kim | C08F 220/06 524/878 |
| 2010/0313782 A1 | 12/2010 | Loccufler | |
| 2011/0263800 A1 * | 10/2011 | Choe | B01J 19/0093 526/64 |
| 2012/0288692 A1 | 11/2012 | Broyles | |
| 2012/0315474 A1 | 12/2012 | Licht | |
| 2014/0209968 A1 | 7/2014 | Ozai | |

FOREIGN PATENT DOCUMENTS

| | | |
|---|---|---|
| EP | 0372756 | 6/1990 |
| EP | 1772500 | 4/2007 |
| EP | 2385084 | 11/2011 |
| JP | 2004-83645 | 3/2004 |
| JP | 2004-83646 | 3/2004 |
| JP | 2010-235845 | 10/2010 |
| WO | WO 2004-092295 | 10/2004 |
| WO | WO 2007-030640 | 3/2007 |
| WO | WO 2011-038448 | 4/2011 |
| WO | WO 2011-068754 | 6/2011 |
| WO | WO 2012-148608 | 11/2012 |
| WO | WO 2012-177337 | 12/2012 |
| WO | WO 2014-172185 | 10/2014 |
| WO | WO 2015-157350 | 10/2015 |
| WO | WO 2016-040773 | 3/2016 |

OTHER PUBLICATIONS

Rodriguez, "Polymerization Strategies to overcome limiting monomer conversion in silicone-acrylic mimiemulsion polymerization", Feb. 2008, vol. 49, No. 3, pp. 691-696.

Rojo, From Natural Products to Polymeric Derivatives of "Eugenol": A New Approach for Preparation of Dental Composites and Orthopedic Bone Cements, Biomacromolecules, 2006, vol. 7, pp. 2751-2761.

Solomon, "Polymerization of Assymmetric Tetrafunctional Monomers. I. The Study of Radical Bulk Polymerization of Acrylic and Methacrylic Esters of 2-Allylphenol", Journal of Applied Polymer Science, 1967, vol. 11, pp. 1631-1639.

Stanzione, "Lignin Model Compounds as Bio-Based Reactive Diluents for Liquid Molding Resins", ChemSusChem, 2012, vol. 5, pp. 1291-1297.

Sun, "Synthesis and Characterization of Network Type Single Ion Conductors", Macromolecules, 2004, vol. 37, pp. 2219-2227.

Vani, Syntheses of allyl phenyl acrylates and their evaluation as reactive diluents in UV-curable coating compositions, Progress in Organic Coatings, 1993, vol. 21, pp. 339-352.

International Search Report for PCT International Application No. PCT/US2015/047649 dated Dec. 1, 2015, 4 pages.

* cited by examiner

*Primary Examiner* — Robert S Loewe
(74) *Attorney, Agent, or Firm* — Kent S. Kokko

(57) ABSTRACT

An (meth)acrylate pressure-sensitive adhesive copolymer crosslinking by a vinyl silicon crosslinking agent is described.

12 Claims, No Drawings

US 10,100,237 B2

ACRYLATE ADHESIVE WITH VINYLSILANE CROSSLINKING AGENTS

CROSS REFERENCE TO RELATED APPLICATIONS

This application is a national stage filing under 35 U.S.C. 371 of PCT/US2015/047648, filed Aug. 31, 2015, which claims the benefit of U.S. Application No. 62/044,542, filed Sep. 2, 2014, the disclosure of which is incorporated by reference in its/their entirety herein.

TECHNICAL FIELD OF THE INVENTION

This invention relates to novel crosslinking agents and pressure sensitive acrylate adhesives and tape articles prepared therefrom. The adhesives are characterized by exhibiting an overall balance of adhesive and cohesive characteristics.

BACKGROUND OF THE INVENTION

Pressure sensitive tapes are virtually ubiquitous in the home and workplace. In its simplest configuration, a pressure sensitive tape comprises an adhesive and a backing, and the overall construction is tacky at the use temperature and adheres to a variety of substrates using only moderate pressure to form the bond. In this fashion, pressure sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in *Adhesion and Adhesives Technology: An Introduction*, $2^{nd}$ Ed., Hanser Gardner Publication, Cincinnati, Ohio, 2002. These measurements taken together constitute the balance of properties often used to characterize a PSA.

With broadened use of pressure sensitive tapes over the years, performance requirements have become more demanding. Shear holding capability, for example, which originally was intended for applications supporting modest loads at room temperature, has now increased substantially for many applications in terms of operating temperature and load. So-called high performance pressure sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY

The present disclosure provides novel free-radically curable composition comprising a (meth)acrylate copolymer or (meth)acrylate monomer mixture comprising at least one (meth)acrylate ester and a vinylsilane crosslinking agent having at least two vinyl groups, and a free radical initiator. The silane crosslinking agent may be a silicone, including cyclic siloxanes, or a carbosilane. Preferably the crosslinking agent has a linear or cyclic siloxane backbone.

More particularly, the present disclosure further provides a syrup polymer composition comprising an vinylsilane-functional (meth)acrylate copolymer and the crosslinking agent. In one aspect, the disclosure provides a novel syrup polymer composition comprising a) a first component vinylsilane-functional (meth)acrylate solute copolymer, b) a second component comprising at least one free-radically polymerizable solvent monomer, and c) the vinylsilane crosslinking agent. The syrup composition comprises at least one crosslinking monomer in the solvent monomer component and/or the (meth)acrylic solute polymer comprises polymerized units derived from at least one crosslinking monomer. The syrup polymer composition may be polymerized and cured to produce a pressure-sensitive adhesive. The silane crosslinking agent may be a silicone, or a carbosilane In another embodiment, a polymerizable composition is provided comprising a monomer mixture of (meth)acrylate ester monomers, acid-functional monomers, optionally non-acid functional polar monomers, other optional monomers, and the crosslinking agent in a suitable solvent. The solution may be solution polymerized to provide a crosslinked pressure-sensitive adhesive.

The pressure-sensitive adhesives, the crosslinked compositions of this disclosure, provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz. In some embodiments, the storage modulus of the pressure sensitive adhesive at room temperature (25° C.) is less than $2 \times 10^6$ dynes/cm or $1 \times 10^6$ dynes/cm at a frequency of 1 Hz "Syrup polymer" refers to a solution of a solute polymer in one or more solvent monomers, the solution having a viscosity of from 500 to 10,000 cPs (centipoise) at 22° C. "Solution polymer" refers to a solution of a solute polymer in one or more organic solvents. (Meth)acrylic is inclusive of both methacrylic and acrylic.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term heteroalkyl refers to an alkyl group, as just defined, having at least one catenary carbon atom (i.e. in-chain) replaced by a catenary heteroatom such as O, S, or N.

"Aryl" means a monovalent aromatic, such as phenyl, naphthyl and the like.

"Aralkylene" means an alkyl group defined above with an aryl group attached to the alkylene, e.g., benzyl, 1-naphthylethyl, and the like.

Alkarylene means an aryl group defined above with an alkyl group attached to the alkylene, e.g., methylphenyl-, ethylnaphthyl, and the like.

The term "hydrocarbyl" is inclusive of aryl and alkyl that may be mono- or divalent in the context of the formula, and preferably has bwtween 2 and 10 carbon atoms.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

The term vinyl silane refers to the ~Si—CH=CH$_2$ group.

DETAILED DESCRIPTION

The present disclosure provides crosslinkable composition comprising an vinyl-functional (meth)acrylate copolymer and a crosslinking agent of the general formulas:

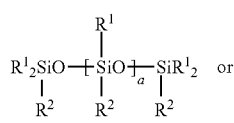

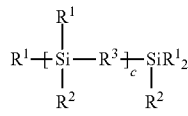

$R^1$ is a monovalent hydrocarbyl group; including alkyl and aryl groups;
$R^2$ is $R^1$ or vinyl group Z;
$R^3$ is a linear or branched divalent alkylene having from 2 to 10 carbon atoms;
a is 0 to 85, preferably greater than 1 and less than 65;
c is 1 to 35;
wherein at least two of said $R^2$ groups are a vinyl group Z.

In some embodiments the vinyl groups Z groups are terminal. In other embodiments the vinyl groups Z groups are pendent from the silicone or carbosilane chain.

In some embodiments this disclosure provides a syrup polymer composition comprising a first component solute (meth)acrylate copolymer, and a second component solvent monomer. The crosslinking agent may be incorporated as polymerized monomer units in the solute copolymer, providing pendent vinyl groups thereto. Alternately, or in addition to, the second component solvent monomer component may contain the crosslinking agent.

In another embodiment, a polymerizable composition is provided comprising a monomer mixture of (meth)acrylate ester monomers, acid-functional monomers, optionally non-acid functional polar monomers, other optional monomers, and the crosslinking agent in a suitable solvent. The solution may be initially solution polymerized to produce a non-crosslinked solution polymer that may then be irradiated or thermally treated to give a crosslinked pressure-sensitive adhesive.

The (meth)acrylic polymer, or the monomer mixture, comprises one or more (meth)acrylate ester monomers derived from a (e.g. non-tertiary) alcohol containing from 1 to 14 carbon atoms and preferably an average of from 4 to 12 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like. In some embodiments, a preferred (meth)acrylate ester monomer is the ester of (meth)acrylic acid with isooctyl alcohol.

In some favored embodiments, the monomer is the ester of (meth)acrylic acid with an alcohol derived from a renewable source. A suitable technique for determining whether a material is derived from a renewable resource is through $^{14}$C analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}$C) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol.

The (e.g. pressure sensitive) adhesive (e.g. (meth)acrylic polymer and/or free-radically polymerizable solvent monomer) comprises one or more low $T_g$ (meth)acrylate monomers, having a $T_g$ no greater than 10° C. when reacted to form a homopolymer. In some embodiments, the low $T_g$ monomers have a $T_g$ no greater than 0° C., no greater than −5° C., or no greater than −10° C. when reacted to form a homopolymer. The $T_g$ of these homopolymers is often greater than or equal to −80° C., greater than or equal to −70° C., greater than or equal to −60° C., or greater than or equal to −50° C. The $T_g$ of these homopolymers can be, for example, in the range of −80° C. to 20° C., −70° C. to 10° C., −60° C. to 0° C., or −60° C. to −10° C.

Exemplary low $T_g$ monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low $T_g$ heteroalkyl acrylate monomers include, but are not limited to, 2-methoxyethyl acrylate and 2-ethoxyethyl acrylate.

In some embodiments, the (e.g. pressure sensitive) adhesive (e.g. (meth)acrylic polymer and/or free radically polymerizable solvent monomer) comprises low $T_g$ monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl methacrylate, isooctyl methacrylate, n-octyl methacrylate, 2-octyl methacrylate, isodecyl methacrylate, and lauryl methacrylate. Likewise, some heteroalkyl methacrylates such as 2-ethoxy ethyl methacrylate can also be used.

In some embodiments, the (e.g. pressure sensitive) adhesive (e.g. (meth)acrylic polymer and/or free-radically polymerizable solvent monomer) comprises a high $T_g$ monomer, having a $T_g$ greater than 10° C. and typically of at least 15° C., 20° C., or 25° C., and preferably at least 50° C. Suitable high Tg monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

In some embodiments, the (meth)acrylic polymer is a homopolymer. In other embodiments, the (meth)acrylic polymer is a copolymer. Unless specified otherwise, the term polymer refers to both a homopolymer and copolymer.

The $T_g$ of the copolymer may be estimated by use of the Fox equation, based on the $T_g$ of the constituent monomers and the weight percent thereof.

The (meth)acrylate ester monomer is present in an amount of 85 to 99 parts by weight based on 100 parts total monomer content used to prepare the polymer. Preferably the (meth)acrylate ester monomer is present in an amount of 90 to 95 parts by weight based on 100 parts total monomer content. When high and/or low $T_g$ monomers are included in a pressure sensitive adhesive, the adhesive may include at least 5, 10, 15, 20, to 30 parts by weight of such high $T_g$ monomer(s).

The (meth)acrylic polymer may optionally comprise an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In some embodiments, the acid functional monomer is generally used in amounts of 0.5 to 15 parts by weight, preferably 0.5 to 10 parts by weight, based on 100 parts by weight total monomer or polymerized units.

The (meth)acrylic copolymer may optionally comprise other monomers such as a non-acid-functional polar monomer.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

The polar monomer may be present in amounts of 0 to 20 parts by weight, preferably less than 10 parts, and more preferably 1 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer or polymerized units.

Xlinker

The crosslinking agent is crosslinking agent of the general formulas:

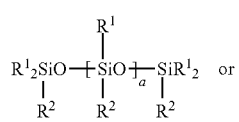   I

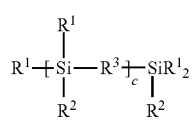   II $R^1$ is a monovalent alkyl and aryl group;
$R^2$ is $R^1$ or vinyl group Z;
$R^3$ is a linear or branched divalent alkylene having from 2 to 10 carbon atoms;
a is 0 to 85,
c is 1 to 35;
wherein at least two of said $R^2$ groups are a vinyl group Z.

In some embodiments the silicone crosslinking agent comprises terminal ethylenically unsaturated groups and is of the formula:

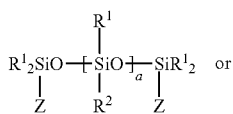

Ia

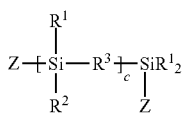

IIb $R^1$ is a monovalent alkyl or aryl group;
$R^3$ is a linear or branched divalent alkylene having from 2 to 10 carbon atoms
Z is and ethylenically unsaturated group;
a is 0 to 85,
c is 1 to 35, In some embodiments the silicone crosslinking agent comprises pendent ethylenically unsaturated groups and is of the formula:

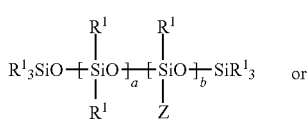

Ic

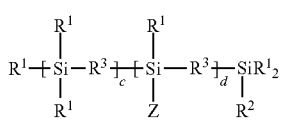

IId wherein Z is an ethylenically unsaturated group,
$R^1$ is a monovalent saturated organic group;
$R^4$ and $R^5$ are independently monovalent alkyl or aryl groups;
a is 0 to 85,
b is 2 to 30; and
a+b is 2 to 85
c is 1 to 35;
d is 2 to ???; and
c+d is 3 to 35

With respect to Formulas it will be understood the illustrated silicones and carbosilanes may be random or block copolymers. The number of silicone units, represented by integers a, b and c is generally at least ten, at preferably at least 50. The monovalent organic groups represented by $R^1$ may have 1 to 20 carbon atoms, alternatively 1 to 10 carbon atoms. Examples of monovalent organic groups include, but are not limited to, monovalent hydrocarbon groups. Monovalent hydrocarbon groups include, but are not limited to, alkyl such as methyl, ethyl, propyl, pentyl, octyl, undecyl, and octadecyl; cycloalkyl such as cyclohexyl, and aromatic groups (aryl) such as phenyl, tolyl, and napthyl.

The Z group of the vinyl silicon crosslinking agent may be represented as ~Si—CH=$CH_2$.

The silicone of Formula 1 have a $M_w$ of at least 186 (for a dimer), preferably at least 100 to 1000. In some embodiments, the $M_w$ may be 2000 or greater, 4,000 or greater. In some embodiments, the $M_w$ may be limited to 50,000 or less; preferably limited to 5,000 or less.

The vinyl silicon crosslinkers of the Formulas comprise an average of at least two vinyl groups. In some embodiments, the crosslinker has a vinyl equivalent weight of no greater than 60,000 grams per equivalent, e.g., no greater than 20,000, or even no greater than 10,000 grams per equivalent. In some embodiments, the crosslinker has a vinyl equivalent weight of 2000 to 5000 grams per equivalent, e.g., 2000 to 4000 grams per equivalent, or even 2500 to 3500 grams per equivalent.

Examples of useful silicones having a plurality of vinyl groups include vinyl terminated polydimethylsiloxanes having the formula $H_2C$=$CHSiMe_2O(SiMe_2O)_n$ $SiMe_2CH$=$CH_2$ (CAS 68083-19-2); vinyl terminated dimethylsiloxane-diphenylsiloxane copolymers having the formula $H_2C$=$CHSiMe_2O(SiMe_2O)_n(SiPh_2O)$ $mSiMe_2CH$=$CH_2$ (CAS: 68951-96-2); vinyl terminated polyphenylmethylsiloxanes having the formula $H_2C$=$CHSiMePhO(SiMePhO)_nSiMePhCH$=$CH_2$ (CAS: 225927-21-9); vinyl-phenylmethyl terminated vinylphenylsiloxane-methylphenylsiloxane copolymers (CAS: 8027-82-1); vinyl terminated siloxane copolymers having the formula $H_2C$=$CHSiMePhO(SiMe_2O)_n(SiMe(CH_2CH_2CH_3)O)$ $mSiMePhCH$=$CH_2$; $H_2C$=$CHSiMe_2O$—$(SiMe_2O)_n(SiMe(CH_2CH_2CH_3)O)_mSiMe_2CH$=$CH_2$, $H_2C$=$CHSiMe_2O$—$(SiMe_2O)_n(SiMe(CH_2C_5H_{11})O)_mSiMe_2CH$=$CH_2$, $H_2C$=$CHSiMe_2O(SiMe_2O)_n(SiEt_2O)_nSiMe_2CH$=$CH_2$; trimethylsiloxy terminated vinylmethylsiloxane-dimethylsiloxane copolymers $Me_3SiO(SiMe_2O)_n(SiMe(CH$=$CH_2)O)_mSiMe_3$ (CAS: 67762-94-1); vinyl terminated vinylmethylsiloxane-dimethylsiloxane copolymers having the formula $H_2C$=$CH(SiMe_2O)_n(SiMeCH$=$CH_2O)_mSiMe_2CH$=$CH_2$ (CAS: 68063-18-1); and vinylmethylsiloxane homopolymers (cyclic and linear) having the formula $Me_3SiO(SiMe(CH$=$CH_2)O)_nSiMe_3$.

The vinyl silane crosslinking agent may also comprise a cyclic vinyl silicone including divinyl tetraalkylcyclotrisiloxane, divinyl hexahydrocarbylcyclotetrasiloxanes, divinyl octahydrocarbylcyclopentasiloxane, and divinyl decahydrocarbylcyclohexasiloxanes, where the hydrocarbyl groups thereof may be selected from alkyl and aryl groups. Aryl groups may be substituted for the alkyl groups, such as divinyl diaryldialkylcyclotrisiloxanes.

The vinyl silicones may be prepared from monomeric silanes by condensation of dialkoxysilanes to form the linear silicone chain, and endcapping with monoalkoxysilanes. Useful dialkoxysilanes include dimethoxydimethylsilane, dimethoxydiethylsilane, diethoxydimethylsilane, diethoxydiethylsilane, and other dialkoxydialkylsilanes. Useful monoalkoxysilanes include methoxytrimethylsilane, methoxytriethylsilane, ethoxytriimethylsilane, ethoxytriethylsilane, and other alkoxytrialkylsilanes. For vinylsilicone compounds having pendent vinyl groups, a portion of the dialkoxysilanes includes a vinylalkyldialkoxysilane such as methylvinyldimethoxysiane. For vinylsilicone compounds having terminal vinyl groups, a portion of the monoalkoxysilane includes a vinyldialkylalkoxysilane such as vinyldimethyldimethoxysilane. For example, dimethoxydimethylsilane may be condensed with dimethoxymethylvinylsilane, then the resulting copolymer endcapped with trimethylmethoxysilane and/or vinyldimethylmethoxysilane. Alternatively, oen or more dialkyl, diaryl or alkylaryldialkoxysilanes may be condensed and endcapped with a vinyldialkylalkoxysilane.

Some carbosilanes may be prepared by hydrosilating a hydrosilane having two vinyl groups with a dichloro- or dibromo-dihydrosilane to form a linear intermediate having reactive chloro- or bromo groups, then vinylating the intermediate with a vinyl Grignard or vinyl lithium reagent to form a second intermediate haing reactive vinyl groups, then repeating the alternate hydrosilation and vinylation steps to form an oligomeric carbosilane having terminal vinyl groups. This vinyl terminated carbosilane oligomer may be further hydrosilated with a vinyl, dialkyl- or diarylsilane. Reference may be made to U.S. Pat. No. 5,276,110 (Zhou et al.), incorporated herein by reference.

Carbosilanes where R* is aryl may be prepared suing the techniques described in Silicones, Enc. Of Polymer Science and Technology, $2^{nd}$ edition, vol. 15, John Wiley and Sons, NY, 1989.

In favored embodiments, the crosslinked adhesive composition comprises high shear values to stainless steel, i.e. greater than 10,000 minutes at 70° C., as determined according to the test methods described in the examples. The crosslinked pressure sensitive adhesive can exhibit a variety of peel adhesion values depending on the intended end use. In some embodiments, the 180° degree peel adhesion to stainless steel is least 15 N/dm. In other embodiments, the 180° degree peel adhesion to stainless steel is least 20, 25, 30, 35, 40, 45, 50, 55, 60, 65, 70, or 75 N/dm. The 180° degree peel adhesion to stainless steel is typically no greater than 150 or 100 N/dm. Such peel adhesive values are also attainable when adhered to other substrates.

The (e.g. pressure sensitive) adhesive may optionally comprise another crosslinker in addition to the crosslinker having a vinylsilane group. In some embodiments, the (e.g. pressure sensitive) adhesive comprises a multifunctional (meth)acrylate. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof.

Generally the multifunctional (meth)acrylate is not part of the original monomer mixture, but added subsequently after the formation of the (meth)acrylic polymer. If used, the multifunctional (meth)acrylate is typically used in an amount of at least 0.01, 0.02, 0.03, 0.04, or 0.05 up to 1, 2, 3, 4, or 5 parts by weight, relative to 100 parts by weight of the total monomer content.

The (meth)acrylic copolymers and adhesive composition can be polymerized by various techniques including, but not limited to, solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature. Examples of typical solvents include methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Useful initiators include those that, on exposure to heat or light, generate free-radicals that initiate (co)polymerization of the monomer mixture. The initiators are typically employed at concentrations ranging from about 0.0001 to about 3.0 parts by weight, preferably from about 0.001 to about 1.0 parts by weight, and more preferably from about 0.005 to about 0.5 parts by weight of the total monomer or polymerized units.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the pressure sensitive adhesive.

The polymers prepared from solution polymerization have pendent unsaturated groups that can be crosslinked by a variety of methods. These include addition of thermal or photo initiators followed by heat or UV exposure after coating. The polymers may also be crosslinked by exposure to electron beam or gamma irradiation.

One method of preparing (meth)acrylic polymers includes partially polymerizing monomers to produce a syrup composition comprising the solute (meth)acrylic polymer and unpolymerized solvent monomer(s). The unpolymerized solvent monomer(s) typically comprises the same monomer as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth)acrylic polymer. Further, the same monomer(s) or other monomer(s) can be added to the syrup once the (meth)acrylic polymer has been formed. Partial polymerization provides a coatable solution of the (meth)acrylic solute polymer in one or more free-radically polymerizable solvent monomers. The partially polymerized composition is then coated on a suitable substrate and further polymerized.

In some embodiments, the silane crosslinking agent is added to the monomer(s) used to produce the (meth)acrylic polymer. Alternatively or in addition thereto, the silane crosslinking agent may be added to the syrup after the (meth)acrylic polymer has been formed. Without intending to be bound by theory, it is surmised that at least a portion of the vinyl crosslink with each other during radiation curing of the syrup. Other reaction mechanisms may also occur.

The syrup method provides advantages over solvent or solution polymerization methods; the syrup method yielding higher molecular weight materials. These higher molecular weights increase the amount of chain entanglements, thus increasing cohesive strength. Also, the distance between cross-links can be greater with high molecular syrup polymer, which allows for increased wet-out onto a surface.

Polymerization of the (meth)acrylate solvent monomers can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the syrup.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

The polymerization is preferably conducted in the absence of solvents such as ethyl acetate, toluene and tetrahydrofuran, which are non-reactive with the functional groups of the components of the syrup composition. Solvents influence the rate of incorporation of different monomers in the polymer chain and generally lead to lower molecular weights as the polymers gel or precipitate from solution. Thus, the (e.g. pressure sensitive) adhesive can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime.
Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, i.e., photoinitiator can be added to the syrup composition. Such polymerizable photoinitiators are described, for example, in U.S. Pat. Nos. 5,902,836 and 5,506,279 (Gaddam et al.).

Such photoinitiators preferably are present in an amount of from 0.1 to 1.0 part by weight, relative to 100 parts by weight of the total syrup content. Accordingly, relatively thick coatings can be achieved when the extinction coefficient of the photoinitiator is low.

The syrup composition and the photoinitiator may be irradiated with activating UV radiation to polymerize the monomer component(s). UV light sources can be of two types: 1) relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is typically at least 100,000 or 250,000 and preferably at least 500,000 g/mole or greater.

When preparing (meth)acrylic polymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

The copolymer resulting from the polymerization of the monomers has the general formula $\sim[M^{acrylate}]_m\text{-}[M^{acid}]_n\text{-}[M^{polar}]_o\text{-}[M^{vinyl}]_p[M^{xlink}]_q\sim$, where
[$M^{acrylate}$] represents polymerized acrylate ester monomer units, where subscript m corresponds to the parts by weight thereof;
[$M^{acid}$] represents polymerized acid monomer units, where subscript n corresponds to the parts by weight thereof;
[$M^{polar}$]-represents polymerized non-acid functional polar monomer units, where subscript o corresponds to the parts by weight thereof;
[$M^{vinyl}$] represents polymerized other monomer units, where subscript p corresponds to the parts by weight thereof; and
[$M^{xlink}$] represents polymerized vinyl crosslinker monomer units, where subscript q corresponds to the parts by weight thereof. It will be understood that the crosslinker may be partially incorporated into the copolymer and have a free, pendent vinyl group, or may be crosslinked to another copolymer chain.

The pressure-sensitive adhesives may optionally contain one or more conventional additives. Preferred additives include tackifiers, plasticizers, dyes, antioxidants, UV stabilizers, and (e.g. inorganic) fillers such as (e.g. fumed and nanoparticle) silica and glass bubbles.

In some embodiments, the pressure sensitive adhesive comprises fumed silica. Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates. Fumed silica is commercially available from various global producers including Evonik, under the trade designation "Aerosil"; Cabot under the trade designation "Cab-O-Sil", and Wacker Chemie-Dow Corning. The BET surface area of suitable fumed silica is typically at least 50 m$^2$/g, or 75 m$^2$/g, or 100 m$^2$/g. In some embodiments, the BET surface area of the fumed silica is no greater than 400 m$^2$/g, or 350 m$^2$/g, or 300 m$^2$/g, or 275 m$^2$/g, or 250 m$^2$/g. The fumed silica aggregates preferably comprise silica having a primary particle size no greater than 20 nm or 15 nm. The aggregate particle size is substantially larger than the primary particle size and is typically at least 100 nm or greater.

The concentration of (e.g. fumed) silica can vary. In some embodiments, such as for conformable pressure sensitive adhesives, the adhesive comprises at least 0.5, 1.0, 1.1, 1.2, 1.3, 1.4, or 1.5 wt-% of (e.g. fumed) silica and in some embodiments no greater than 5, 4, 3, or 2 wt-%. In other embodiments, the adhesive comprises at least 5, 6, 7, 8, 9, or 10 wt-% of (e.g. fumed) silica and typically no greater than 20, 19, 18, 17, 16, or 15 wt-% of (e.g. fumed) silica.

In some embodiments, the pressure sensitive adhesive comprises glass bubbles. Suitable glass bubbles generally have a density ranging from about 0.125 to about 0.35 g/cc. In some embodiments, the glass bubbles have a density less than 0.30, 0.25, or 0.20 g/cc. Glass bubbles generally have a distribution of particles sizes. In typical embodiments, 90% of the glass bubbles have a particle size (by volume) of at least 75 microns and no greater than 115 microns. In some embodiments, 90% of the glass bubbles have a particle size (by volume) of at least 80, 85, 90, or 95 microns. In some embodiments, the glass bubbles have a crush strength of at least 250 psi and no greater than 1000, 750, or 500 psi. Glass bubbles are commercially available from various sources including 3M, St. Paul, Minn.

The concentration of glass bubbles can vary. In some embodiments, the adhesive comprises at least 1, 2, 3, 4 or 5 wt-% of glass bubbles and typically no greater than 20, 15, or 10 wt-% of glass bubbles.

The inclusion of glass bubbles can reduce the density of the adhesive. Another way of reducing the density of the adhesive is by incorporation of air or other gasses into the adhesive composition. For example the (e.g. syrup) adhesive composition can be transferred to a frother as described for examples in U.S. Pat. No. 4,415,615; incorporated herein by reference. While feeding nitrogen gas into the frother, the frothed syrup can be delivered to the nip of a roll coater between a pair of transparent, (e.g. biaxially-oriented polyethylene terephthalate) films. A silicone or fluorochemical surfactant is included in the froathed syrup. Various surfactants are known including copolymer surfactants described in U.S. Pat. No. 6,852,781.

In some embodiments no tackifier is used. When tackifiers are used, the concentration can range from 5 or 10 wt-% to 40, 45, 50, 55, or 60 wt-% of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from C5 and C9 monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone"(Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

Depending on the kinds and amount of components, the pressure sensitive adhesive can be formulated to have a wide variety of properties for various end uses.

The adhesives of the present disclosure may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. In some embodiments, the backing is comprised of a bio-based material such as polylactic acid (PLA).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Suitable primers include for example those described in EP 372756, U.S. Pat. No. 5,534,391, U.S. Pat. No. 6,893,731, WO2011/068754, and WO2011/38448.

In some embodiments, the backing material is a transparent film having a transmission of visible light of at least 90 percent. The transparent film may further comprise a graphic. In this embodiment, the adhesive may also be transparent.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. The composition may also be coated from the melt. These various methods of coating allow the compositions to be placed on the substrate at variable thicknesses thus allowing a wider range of use of the compositions. Coating thicknesses may vary as previously described. The syrup composition may be of any desirable concentration for subsequent coating, but is typically 5 to 20 wt-% polymer solids in monomer. The desired concentration may be achieved by further dilution of the coating composition, or by partial drying. Coating thicknesses may vary from about 25 to 1500 microns (dry thickness). In typical embodiments, the coating thickness ranges from about 50 to 250 microns.

The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner. Additional tape constructions include those described in U.S. Pat. No. 5,602,221 (Bennett et al.), incorporated herein by reference.

EXAMPLES

TABLE 1

Glossary of Materials

| Material | Description, Source |
|---|---|
| 2-Octyl acrylate (2OA) | Prepared according to Preparatory Example 1 of U.S. Pat. No. 7,385,020. |
| Isooctyl acrylate (IOA) | Obtained from 3M Company (St. Paul, MN, USA) |
| Acrylic acid (AA) | Obtained from BASF Corporation (Florham Park, NJ, USA) |
| IRGACURE 651 (651) | Obtained from BASF Corporation (Florham Park, NJ, USA) |
| SID4608.0 (SID-1) | 1,3-divinyl-1,3-diphenyl-1,3-dimethyl disiloxane, available from Gelest, Inc. (Morristown, PA, USA) |
| SID4613.0 (SID-2) | 1,3-divinyl tetramethyl disiloxane, available from Gelest, Inc. (Morristown, PA, USA) |
| SID4614.0 (SID-3) | 1,4-divinyl-1,1,4,4-tetramethyl-1,4-disilabutane, available from Gelest, Inc. (Morristown, PA, USA) |
| SIT7900.0 (SIT-1) | 1,3,5,7-Tetravinyl-1,3,5,7-tetramethylcyclotetrasiloxane, available from Gelest, Inc. (Morristown, PA, USA) |
| VMS-T11 (T11) | Vinylmethyl homopolymer ~1,000-1,500 g/mol, available from Gelest, Inc. (Morristown, PA, USA) |
| DMS-U21 (U21) | (3-acryloxy-2-hydroxypropoxypropyl)-terminated polydimethylsiloxane 600-900 g/mol, available from Gelest, Inc. (Morristown, PA, USA) |
| PMV-9925 (PMV-1) | vinyl-terminated polyphenylmethylsiloxane ~2,000-3,000 g/mol, available from Gelest, Inc. (Morristown, PA, USA) |
| DMS-V05 (V05) | Vinyl-terminated polydimethyl siloxane ~800 g/mol, available from Gelest, Inc. (Morristown, PA, USA) |
| DMS-V22 (V22) | Vinyl-terminated polydimethyl siloxane ~9400 g/mol, available from Gelest, Inc. (Morristown, PA, USA) |

TABLE 1-continued

Glossary of Materials

| Material | Description, Source |
|---|---|
| DMS-V25R (V25R) | Vinyl-terminated polydimethyl siloxane ~17,200 g/mol, available from Gelest, Inc. (Morristown, PA, USA) |
| SILMER VIN 70 (VIN70) | Vinyl-terminated polydimethyl siloxane ~3,900 g/mol, available from Siltech Corporation (Toronto, ON, CAN) |
| Ethyl acetate | Obtained from EMD Chemicals (Gibbstown, NJ, USA) |
| VAZO52 (V52), 2,2'-azobis(2,4-dimethyl valeronitrile) | Obtained from DuPont (Wilmington, DE, USA) |
| Isooctyl thioglycolate (IOTG) | Obtained from TCI (Tokyo, Japan) |
| T10 release liner (T10) | Obtained from Solutia, Inc. (Kingsport, MO, USA) |
| T50 release liner (T50) | Obtained from Solutia, Inc. (Kingsport, MO, USA) |
| Hostaphan 3SAB (PET) | Obtained from Mitsubshi Polyester Films, Inc. (Greer, SC, USA) |

Test Methods
Test Method 1: 70° C. Shear Strength Test

Stainless steel (SS) plates were prepared for testing by cleaning with methyl ethyl ketone and a clean KIMWIPE tissue (Kimberly-Clark, Dallas, Tex.) three times. The adhesive films described were cut into strips (1.27 cm in width) and adhered by their adhesive to flat, rigid stainless steel plates with a 2.54 cm length of each adhesive film strip in contact with the plate to which it was adhered. A weight of 2 kilograms (4.5 pounds) was rolled over the adhered portion. Each of the resulting plates with the adhered film strip was equilibrated at room temperature for 15 minutes. Afterwards, the samples was transferred to a 70° C. oven, in which a 500 g weight was hung from the free end of the adhered film strip with the panel tilted 2° from the vertical to insure against any peeling forces. The time (in minutes) at which the weight fell, as a result of the adhesive film strip releasing from the plate, was recorded. The test was discontinued at 10,000 minutes if there was no failure. In the Table, this is designated as 10,000+ minutes. Two specimens of each tape (adhesive film strip) were tested and the shear strength tests were averaged to obtain the reported shear values.

Test Method 2: 180° Peel Adhesion Test

Peel adhesion was the force required to remove an adhesive-coated test specimen from a test panel measured at a specific angle and rate of removal. In the Examples, this force is expressed in ounces per inch width of coated sheet and the results are normalized to N/dm. The following procedure was used:

Peel adhesion strength was measured at a 180° peel angle using an IMASS SP-200 slip/peel tester (available from IMASS, Inc., Accord Mass.) at a peel rate of 305 mm/minute (12 inches/minute). Stainless steel (SS) test panels were prepared as described above. The cleaned panel was allowed to dry at room temperature. An adhesive coated film was cut into tapes measuring 1.27 cm×20 cm (½ in.×8 in.). A test sample was prepared by rolling the tape down onto a cleaned panel with 2 passes of a 2.0 kg (4.5 lb.) rubber roller. The prepared samples were dwelled at 23° C./50% relative humidity (RH) for 15 minutes before testing. Four samples were tested for each example. The resulting peel adhesion was converted from ounces/0.5 inch to ounces/inch and N/dm with both values being reported.

Preparatory Example 1: Synthesis of Vinyl-Terminated Polydimethyl Siloxane (VPS) ~2,250 g/mol A mixture of octamethylcyclotetrasiloxane (950.0 g, 3.2 mol, Gelest, Inc.), 1,4-divinyltetramethyldisiloxane (79.51 g, 0.43 mol, Gelest, Inc.), sulfuric acid (0.95 g, J. T. Baker, Center Valley, Pa.), and DARKO G-60 carbon (4.75 g, Cabot Norit Inc., Marshall, Tex.) were mixed in a bottle and placed on a mechanical shaker overnight at room temperature for 17 hours. The mixture was filtered using a fritted glass filter with CELITE/glass wool as the filter medium. The polymer was concentrated on a thin film evaporator at 0.11 mmHg at 185° C. with a condensation temperature of −15° C. to give a colorless liquid. NMR analysis of the polymer showed an approximate molecular weight of 2250 g/mol.

Examples 1-6, 8-37, and Comparative Examples C1-C2

Adhesive compositions were prepared by charging an 8 ounce (~237 mL) jar with 45 g of 2OA, 5 g of AA, 0.02 g of IRGACURE 651, and the amounts and types of vinyl terminated siloxane compounds as shown in Table 2 (note that for Examples 16 to 19, the "VPS" material was prepared as in Preparatory Example 1). The monomer mixture was purged with nitrogen for 2 minutes, and then exposed to "UV A" light from a low intensity black bulb (15 watt, 350 nm peak) until the viscosity increased and a coatable syrup was prepared.

An additional 0.08 g (0.16 phr) of the 651 was mixed into the prepolymer syrup. The compositions were then coated between T10 and T50 release liners at a 5 mil (0.125 mm) thickness and cured by exposure to UV A light as shown in Table 2 over 10 minutes. Total UV exposure was measured with an UVIRAD LOW ENERGY UV INTEGRATING RADIOMETER (EIT, Inc., Sterling, Va.). Tapes were laminated to PET and tested for shear and peel adhesion according to test methods 1 and 2. Results were as summarized in Table 2.

Example 7

Example 29 was made by charging a quart (about 500 mL) jar with 1) 270 g of 2OA, 2) 30 g of AA, 3) 0.12 g (0.04 phr) of IRGACURE 651, and 4) a quantity of SID-2 as shown in Table 2. The monomer mixture was purged with nitrogen for 5 minutes then exposed to low intensity ultraviolet radiation until a coatable prepolymer syrup was prepared. An additional 0.45 g (0.15 phr) of 651 was then added. The pre-adhesive formulations were then coated between T10 and T50 release liners at 2 mil (0.05 mm) thickness and cured under nitrogen by exposure to UV A light as shown in Table 2 over 1 minute. The tape was laminated to PET and tested for shear and peel adhesion according to test methods 1 and 2. Results were as summarized in Table 2.

TABLE 2

Adhesive Properties of Examples 1-28 and Comparative Examples 1-10

| Example # | Crosslinker Material | phr | (g) | Total UV-A Exposure mJ/cm² | 70° C. Shear (min) | 180° Peel Adhesion to SS (oz/in, N/dm) |
|---|---|---|---|---|---|---|
| 1 | SID-1 | 0.5 | 0.25 | 2030 | 1,509 | 90.3, 98.8 |
| 2 | SID-1 | 1 | 0.5 | 2030 | 10,000+ | 89.4, 97.8 |
| 3 | SID-1 | 2 | 1 | 2030 | 10,000+ | 79.6, 87.1 |
| 4 | SID-1 | 4 | 2 | 2030 | 10,000+ | 69.2, 75.7 |
| 5 | SID-2 | 0.5 | 0.25 | 2102 | 10,000+ | 64.1, 70.2 |
| 6 | SID-2 | 1 | 0.5 | 2102 | 10,000+ | 74.7, 81.8 |
| 7 | SID-2 | 3 | 9 | 228 | 10,000+ | 38.0, 41.2 |
| 8 | SID-3 | 0.5 | 0.25 | 1456 | 10,000+ | 91.0, 99.6 |
| 9 | SID-3 | 1 | 0.5 | 1456 | 10,000+ | 83.8, 91.7 |
| 10 | SIT-1 | 0.5 | 0.25 | 1842 | 10,000+ | 92.5, 101.2 |
| 11 | SIT-1 | 1 | 0.5 | 1842 | 10,000+ | 82.8, 90.6 |
| 12 | V05 | 1 | 0.5 | 1650 | 1,263 | 76.1, 83.3 |
| 13 | V05 | 2 | 1 | 1650 | 10,000+ | 73.4, 80.3 |
| 14 | V05 | 4 | 2 | 1650 | 10,000+ | 58.0, 63.5 |
| 15 | V05 | 6 | 3 | 1650 | 10,000+ | 59.2, 64.8 |
| 16 | VPS | 2 | 1 | 1650 | 1,456 | 70.9, 77.6 |
| 17 | VPS | 4 | 2 | 1650 | 5,415 | 61.7, 67.5 |
| 18 | VPS | 6 | 3 | 1650 | 10,000+ | 53.0, 58.0 |
| 19 | VPS | 8 | 4 | 2030 | 10,000+ | 39.8, 43.6 |
| 20 | VIN70 | 1 | 0.5 | 1650 | 215 | 70.4, 77.1 |
| 21 | VIN70 | 2 | 1 | 1650 | 526 | 62.6, 68.5 |
| 22 | VIN70 | 4 | 2 | 1650 | 8,590 | 61.4, 67.2 |
| 23 | VIN70 | 6 | 3 | 1650 | 1,669 | 55.6, 60.9 |
| 24 | PMV-1 | 4 | 2 | 1417 | 1,385 | 69.3, 75.8 |
| 25 | PMV-1 | 6 | 3 | 1417 | 10,000+ | 69.9, 76.5 |
| 26 | PMV-1 | 8 | 4 | 1417 | 10,000+ | 67.4, 73.8 |
| 27 | T11 | 1 | 0.5 | 1417 | 10,000+ | 70.0, 76.6 |
| 28 | T11 | 2 | 1 | 1417 | 10,000+ | 56.5, 61.8 |
| 29 | T11 | 4 | 2 | 1417 | 10,000+ | 48.6, 53.2 |
| 30 | V22 | 4 | 2 | 1650 | 86 | 67.1, 73.4 |
| 31 | V22 | 6 | 3 | 1650 | 149 | 52.4, 57.4 |
| 32 | V22 | 8 | 4 | 1420 | 43 | 5.7, 6.3 |
| 33 | V22 | 10 | 5 | N/A* | N/A | N/A |
| 34 | V25R | 4 | 2 | 1650 | 28 | 61.0, 66.8 |

TABLE 2-continued

Adhesive Properties of Examples 1-28 and Comparative Examples 1-10

| Example # | Crosslinker Material | phr | (g) | Total UV-A Exposure mJ/cm$^2$ | 70° C. Shear (min) | 180° Peel Adhesion to SS (oz/in, N/dm) |
|---|---|---|---|---|---|---|
| 35 | V25R | 6 | 3 | 1650 | 27 | 59.8, 65.5 |
| 36 | V25R | 8 | 4 | 1420 | 53 | 34.5, 37.8 |
| 37 | V25R | 10 | 5 | N/A* | N/A | N/A |
| C1 | U21 | 1 | 0.5 | N/A** | N/A | N/A |
| C2 | None | 0 | 0 | 1821 | 21 | 63.8, 69.8 |

*Sample phase separated upon formation of the prepolymer syrup and was not tested further.
**Sample gelled upon formation of the prepolymer syrup and was not tested further.

Examples 38-51

To a 16 ounce amber bottle, 90 g of 2OA, 5 g of AA 233 g of ethyl acetate, 0.1 g V52, a quantity of IOTG according to Table 3, and a quantity of SID-2 according to Table 3 were combined. The solution was then purged with nitrogen gas for 20 minutes. The bottles were placed in a GLS AQUA 18 PLUS (Grant Instruments) linear shaking water bath at 60° C. After 20 hours, the bottles were removed from the bath and the polymerization was quenched by exposure to oxygen by sparging with air for 1 minute. A quantity of 651 according to Table 3 was then compounded with the polymer solution and the resulting formulations were coated at 5 mil (0.127 mm) thickness on PET (Hostaphan 3SAB; Mitsubishi), and dried at 70° C. for 30 minutes. The adhesive was then laminated with a clear release liner and cured by exposure to UVA light as shown in Table 4 over 10 minutes. Total UV exposure was measured with a UVIRAD LOW ENERGY UV INTEGRATING RADIOMETER (EIT, Inc., Sterling, Va.). Tape samples were then tested for shear and peel adhesion according to test methods 1 and 2, except that the shear strength test was carried out at room temperature with a 1 kg weight. Results were as summarized in Table 4.

Comparative Example C3

To an 8 ounce amber bottle, 54 g of 2OA, 6 g of AA, 140 g of ethyl acetate, and 0.06 (0.1 phr) g V52 were combined. The solution was then purged with nitrogen gas for 20 minutes. The bottle was placed in a GLS AQUA 18 PLUS (Grant Instruments) linear shaking water bath at 52° C. After 20 hours, the bottle was removed from the bath and the polymerization was quenched by exposure to oxygen by sparging with air for 1 minute. A quantity of 651 according to Table 3 was then compounded with the polymer solution and the resulting formulation was coated at 5 mil (0.127 mm) thickness on PET (Hostaphan 3SAB; Mitsubishi), and dried at 70° C. for 30 minutes. The adhesive was then laminated with a clear release liner and cured by exposure to UVA light as shown in Table 4 over 10 minutes. Total UV exposure was measured with a UVIRAD LOW ENERGY UV INTEGRATING RADIOMETER (EIT, Inc., Sterling, Va.). The tape sample was then tested for shear and peel adhesion according to test methods 1 and 2, except that the shear strength test was carried out at room temperature with a 1 kg weight. Results were as summarized in Table 4.

TABLE 3

Components of PSAs for Examples 38-51 and Comparative Example C3.

| Example No. | SID-2 phr | g | IOTG phr | g | 651 phr | g |
|---|---|---|---|---|---|---|
| 38 | 1 | 1 | 0 | 0 | 0 | 0 |
| 39 | 1 | 1 | 0 | 0 | 2 | 0.17 |
| 40 | 2 | 2 | 0 | 0 | 0 | 0 |
| 41 | 2 | 2 | 0 | 0 | 2 | 0.17 |
| 42 | 2 | 2 | 0 | 0 | 4 | 0.34 |
| 43 | 2 | 2 | 0.04 | 0.04 | 0 | 0 |
| 44 | 2 | 2 | 0.04 | 0.04 | 2 | 0.17 |
| 45 | 4 | 4 | 0.2 | 0.2 | 0 | 0 |
| 46 | 4 | 4 | 0.2 | 0.2 | 2 | 0.17 |
| 47 | 4 | 4 | 0.2 | 0.2 | 4 | 0.34 |
| 48 | 6 | 6 | 0.2 | 0.2 | 0 | 0 |
| 49 | 6 | 6 | 0.2 | 0.2 | 2 | 0.17 |
| 50 | 8 | 8 | 0.2 | 0.2 | 0 | 0 |
| 51 | 8 | 8 | 0.2 | 0.2 | 2 | 0.17 |
| C3 | 0 | 0 | 0 | 0 | 2 | 0.17 |

TABLE 4

Adhesive Properties of Examples 38-51 and Comparative Example C3.

| Example No. | Total UV-A Exposure mJ/cm$^2$ | Room Temperature Shear min | 180° Peel Adhesion to SS oz/in, N/dm |
|---|---|---|---|
| 38 | 1605 | 388 | 57.5, 62.9 |
| 39 | 1605 | 10,000+ | 51.0, 55.8 |
| 40 | 2250 | 713 | 53.7, 58.8 |
| 41 | 2250 | 10,000+ | 45.3, 49.6 |
| 42 | 2250 | 10,000+ | 29.0, 31.7 |
| 43 | 2250 | 148 | 61.1, 66.9 |
| 44 | 2250 | 10,000+ | 47.5, 52.0 |
| 45 | 2250 | 164 | 54.2, 59.3 |
| 46 | 2250 | 10,000+ | 38.4, 42.0 |
| 47 | 2250 | 10,000+ | 41.5, 45.4 |
| 48 | 1605 | 211 | 56.9, 62.3 |
| 49 | 1605 | 10,000+ | 40.2, 44.0 |
| 50 | 1605 | 3,614 | 53.1, 58.1 |
| 51 | 1605 | 10,000 | 38.9, 42.6 |
| C3 | 2011 | 880 | 40.7, 44.6 |

This disclosure proves the following illustrative embodiments:

1. A free-radically curable composition comprising:
   a. a monomer mixture comprising at least one (meth)acrylate ester,
   b. a vinylsilicon crosslinking agent having at least two vinyl groups, and
   c. a free radical initiator.

2. The free-radically curable composition of embodiment 1 wherein the crosslinking agent is a silicone is of the formula:

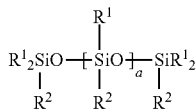

R$^1$ is a monovalent hydrocarbyl group;
R$^2$ is R$^1$ or an ethylenically unsaturated group Z;
a is 0 to 85;
wherein at least two of said R$^2$ groups are a vinyl group Z.

3. The composition of embodiment 2 wherein the crosslinking agent is a silicone is of the formula:

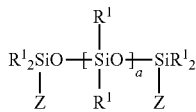

R$^1$ is a monovalent hydrocarbyl group;
Z is a vinyl group;
a is 0 to 85.

4. The composition of embodiment 2 wherein the crosslinking agent is a silicone is of the formula:

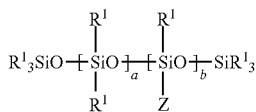

wherein Z is a vinyl group,
R$_1$ is a monovalent hydrocarbyl group;
a is 0 to 85
b is 2 to 30; and
a+b is 2 to 85.

5. The composition of any of the previous embodiments comprising 0.1 to 10 parts by weight of the crosslinking agent relative to 100 parts by weight of the monomer mixture.

6. The composition of embodiment 1 wherein the monomer mixture comprises
   i. 85 to 99.5 parts by weight of an (meth)acrylic acid ester;
   ii. 0.5 to 15 parts by weight of an acid functional monomer;
   iii. 0 to 20 parts by weight of a non-acid functional, ethylenically unsaturated polar monomer;
   iv. 0 to 5 parts vinyl monomer,
   v. 0.1 to 5 parts of a interpolymerized monomer units of the crosslinking agent,
   vi. wherein the sum is 100 parts by weight.

7. The composition of embodiment 1 wherein the crosslinking agent is a cyclic siloxane having at least two vinyl groups.

8. The composition of embodiment 1 wherein the crosslinking agent is a carbosilane of the formula:

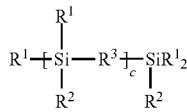
II

R$^1$ is a monovalent hydrocarbyl group; including alkyl and aryl groups;
R$^2$ is R$^1$ or vinyl group Z;
R$^3$ is a linear or branched divalent hydrocarbyl;
c is 1 to 35
wherein at least two of said R$^2$ groups are a vinyl group Z.

9. The composition of embodiment 1 wherein the crosslinking agent is of the formula:

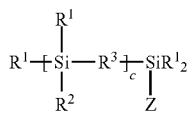

R$^1$ is a monovalent hydrocarbyl group;
R$^3$ is a linear or branched divalent hydrocarbyl group;
Z is a vinyl group;
c is 1 to 35.

10. The composition of embodiment 1 wherein the crosslinking agent is of the formula:

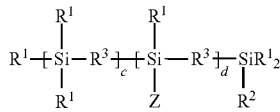

wherein Z is a vinyl group,
R$^1$ is a monovalent saturated organic group;
R$^3$ is a linear or branched divalent hydrocarbyl group;
c is 1 to 35;
d is 2 to 10.

11. A syrup polymer composition comprising
   i) a (meth)acrylic solute copolymer component comprising polymerized units derived from one or more alkyl (meth)acrylate monomers;
   ii) a free-radically polymerizable solvent monomer component;
   iii) a vinyl silicon crosslinking agent having at least two vinyl groups; and wherein the solvent monomer comprises the crosslinking agent and/or the (meth)acrylic solute copolymer comprises polymerized units derived from at least one crosslinking agent.

12. The free-radically curable composition of embodiment 11 wherein the crosslinking agent is of the formula:

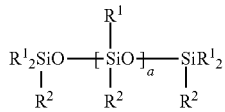

R$^1$ is a monovalent hydrocarbyl group;
R$^2$ is R$^1$ or a vinyl group Z;
a is 0 to 85
wherein at least two of said R$^2$ groups are a vinyl group Z.

13. The composition of embodiment 11 wherein the crosslinking agent is of the formula:

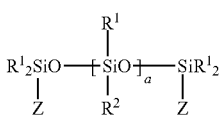

R¹ is a monovalent hydrocarbyl group;
Z is a vinyl group;
a is 0 to 85;

14. The composition of embodiment 11 wherein the crosslinking agent is of the formula:

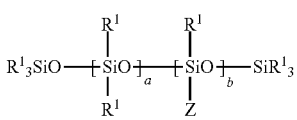

wherein Z is a vinyl group,
R¹ is a monovalent saturated organic group;
a is 0 to 85;
b is 2 to 30
and
a+b is at 2 to 85.

15. The composition of any of embodiments 11-14 comprising 0.1 to 10 parts by weight of the crosslinking agent relative to 100 parts by weight of solvent monomer plus solute copolymer.

16. The composition of any of embodiments 11-14 wherein the solute copolymer comprises interpolymerized monomer units of the crosslinking agent.

17. The composition of any of embodiments 11-16 wherein the solvent monomer component contains the crosslinking agent.

18. The syrup polymer composition of any of embodiments 11-17 comprising:
   a) first component solute copolymer comprising:
      i. 85 to 99.5 parts by weight of an (meth)acrylic acid ester monomer units;
      ii. 0.5 to 15 parts by weight of an acid functional monomer units;
      iii. 0 to 20 parts by weight of a non-acid functional, ethylenically unsaturated polar monomer units;
      iv. 0 to 5 parts vinyl monomer units,
      v. 0 to 5 parts of a monomer units of the crosslinking agent;
      wherein the sum is 100 parts by weight; and
   b) a second component comprising at least one free-radically polymerizable solvent monomer and optional the crosslinking agent, and
   c) 0.1 to 10 parts by weight of the crosslinking agent in the solute copolymer and/or the solvent monomer component, relative to a) plus b).

19. The syrup polymer composition of any of embodiments 11-18 wherein the solvent monomer component comprises
   i. 85 to 99.5 parts by weight of an (meth)acrylic acid ester of non-tertiary alcohol;
   ii. 0.5 to 15 parts by weight of an acid functional monomer;
   iii. 0 to 20 parts by weight of a non-acid functional, ethylenically unsaturated polar monomer;
   iv. 0 to 5 parts vinyl monomer,
      wherein the sum is 100 parts by weight
      0 to 5 parts of a interpolymerized monomer units of the crosslinking agent relative to solvent monomer plus solute copolymer.

20. The composition of any of embodiments 1-19 wherein the crosslinking agent is a cyclic siloxane having at least two vinyl groups.

21. The composition of any of embodiments 1-19 wherein the crosslinking agent is of the formula:

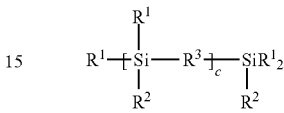

where YES
R¹ is a monovalent alkyl and aryl group;
R² is R¹ or vinyl group Z;
R³ is a linear or branched divalent hydrocarbyl group;
c is 1 to 35;
wherein at least two of said R² groups are a vinyl group Z.

22. The composition of any of embodiments 1-19 wherein the silane crosslinking agent is of the formula:

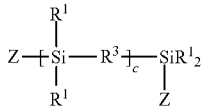

R¹ is a monovalent hydrocarbyl group;
R³ is a linear or branched divalent alkylene having from 2 to 10 carbon atoms
Z is a vinyl group;
c is 1 to 35.

23. The composition of any of embodiments 1-19 wherein the crosslinking agent is of the formula:

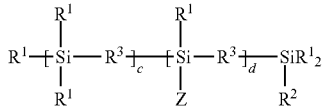

wherein Z is a vinyl group,
R¹ is a monovalent saturated organic group;
R³ is a linear or branched divalent hydrocarbyl group;
c is 1 to 35
d is 2 to 10.

24. A method of making an (meth)acrylate adhesive copolymer comprising
   a) partially polymerizing a (meth)acrylate monomer composition, said monomer mixture optionally containing a vinyl silicon crosslinking agent having at least two vinyl groups to produce a syrup copolymer having a solute copolymer and solvent monomer,
   b) adding silane crosslinking agent to the syrup copolymer composition of step a) if not initially present in the monomer mixture.
   c) further photopolymerizing the syrup polymer composition.

25. The method of embodiment 24 wherein the monomer mixture comprises:
   i. 85 to 99.5 parts by weight of an (meth)acrylic acid ester monomer units;
   ii. 0.5 to 15 parts by weight of an acid functional monomer units;
   iii. 0 to 10 parts by weight of a non-acid functional, ethylenically unsaturated polar monomer units;
   iv. 0 to 5 parts vinyl monomer units,
   v. 0 to 5 parts of a monomer units of the crosslinking agent.
26. The method of embodiment 24 wherein the crosslinking agent is a cyclic siloxane having at least two vinyl groups.
27. The composition of embodiment 24 wherein the crosslinking agent is of the formula:

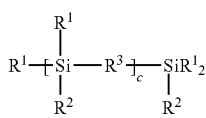

where
   $R^1$ is a monovalent alkyl and aryl group;
   $R^2$ is $R^1$ or vinyl group Z;
   $R^3$ is a linear or branched divalent alkylene having from 2 to 10 carbon atoms;
   c is 1 to 35;
   wherein at least two of said $R^2$ groups are a vinyl group Z.
28. The method of embodiment 24 wherein the crosslinking agent is of the formula:

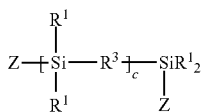

$R^1$ is a monovalent hydrocarbyl group;
$R^3$ is a linear or branched divalent alkylene having from 2 to 10 carbon atoms
Z is a vinyl group;
c is 1 to 35.
29. The method of embodiment 24 wherein the crosslinking agent is of the formula:

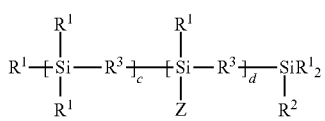

wherein Z is a vinyl group,
$R^1$ is a monovalent saturated organic group;
$R^3$ is a linear or branched divalent alkylene having from 2 to 10 carbon atoms;
c is 1 to 35, and
d is 2 to 10.

30. The method of embodiment 24 wherein the crosslinking agent is a silicone of the formula:

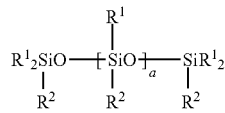

$R^1$ is a monovalent hydrocarbyl group;
$R^2$ is $R^1$ or an ethylenically unsaturated group Z;
a is 0 to 85
wherein at least two of said $R^2$ groups are vinyl groups Z.
31. The method of embodiment 30 wherein the crosslinking agent is a silicone is of the formula:

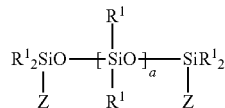

$R^1$ is a monovalent hydrocarbyl group;
Z is a vinyl group;
a is 0 to 85.
32. The method of embodiment 30 wherein the silane crosslinking agent is a silicone is of the formula:

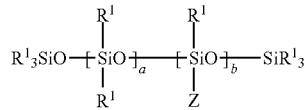

wherein Z is a vinyl group,
$R^1$ is a monovalent saturated organic group;
a is 0 to 85
b is 2 to 30; and
a+b is at 2 to 85.
33. The method of any of embodiments 24-32 comprising 0.1 to 10 parts by weight of the silicone crosslinking agent, relative to 100 parts by weight of monomer.
34. A method of preparing a pressure sensitive adhesive composition comprising:
   a) providing a syrup according to any of embodiments 24 to 33;
   b) applying the syrup to a substrate; and
   c) irradiating the applied syrup thereby crosslinking the adhesive composition.
35. A polymerizable solution comprising:
   i. 85 to 99.5 parts by weight of an (meth)acrylic acid ester;
   ii. 0.5 to 15 parts by weight of an acid functional monomer;
   iii. 0 to 20 parts by weight of a non-acid functional, ethylenically unsaturated polar monomer;
   iv. 0 to 5 parts vinyl monomer, wherein the sum of i to iv is 100 parts by weight
   v. 0.1 to 10 parts of a interpolymerized monomer units of the crosslinking agent of any of embodiments 2-10, relative to 100 parts by weight of i to iv.;
   b) a solvent, and
   c) an initiator.
36. A pressure-sensitive adhesive composition comprising (meth)acrylate copolymer crosslinked by a vinyl silicon crosslinking agent having at least two vinyl groups.

37. The pressure sensitive adhesive composition of embodiment 36 wherein the copolymer is of the formula:

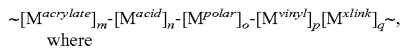
where

[M$^{acrylate}$] represents polymerized acrylate ester monomer units, where subscript m corresponds to 85 to 99.5 parts s by weight thereof;

[M$^{acid}$] represents polymerized acid monomer units, where subscript n corresponds to 0.5 to 15 parts by weight thereof;

[M$^{polar}$]- represents polymerized non-acid functional polar monomer units, where subscript o corresponds to 0 to 20 parts by weight thereof;

[M$^{vinyl}$] represents polymerized other monomer units, where subscript p corresponds to 0 to 5 parts by weight thereof; wherein the sum of n, m, o and p is 100 parts by weight; and

[M$^{xlink}$] represents polymerized vinylsilicon crosslinker monomer units, where subscript q is 0.1 to 10 parts, relative to 100 parts by weight of the sum of n, m, o and p.

What is claimed is:

1. A free-radically curable composition comprising:
   a. a (meth)acrylate monomer mixture comprising at least one (meth)acrylate ester,
   b. a vinyl siloxane crosslinking agent having at least two vinyl groups, and
   a free radical initiator;
   wherein the vinyl siloxane crosslinking agent is of the formula:

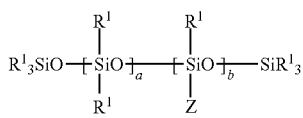

wherein Z is a vinyl group,
R$^1$ is a monovalent hydrocarbyl group;
a is 0 to 85
b is 2 to 30.

2. The composition of claim 1 comprising 0.1 to 10 parts by weight of the crosslinking agent relative to 100 parts by weight of the monomer mixture.

3. The composition of claim 1 wherein the monomer mixture comprises
   i. 85 to 99.5 parts by weight of an (meth)acrylic acid ester;
   ii. 0.5 to 15 parts by weight of an acid functional monomer;
   iii. 0 to 20 parts by weight of a non-acid functional, ethylenically unsaturated polar monomer;
   iv. 0 to 5 parts by weight of a vinyl monomer,
   v. 0.1 to 5 parts by weight of the crosslinking agent,
   vi. wherein the sum is 100 parts by weight.

4. A syrup polymer composition comprising
   i) a (meth)acrylic solute copolymer component comprising polymerized units derived from one or more alkyl (meth)acrylate monomers;
   ii) a free-radically polymerizable solvent monomer component;
   iii) a vinyl siloxane crosslinking agent having at least two vinyl groups; and
   wherein the solvent monomer comprises the crosslinking agent and/or the (meth)acrylic solute copolymer comprises polymerized units derived from at least one crosslinking agent;

wherein the vinyl siloxane crosslinking agent of the formula:

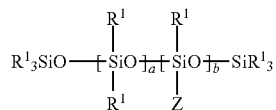

wherein Z is a vinyl group,
R$^1$ is a monovalent hydrocarbyl group;
a is 0 to 85
b is 2 to 30.

5. The composition of claim 4 wherein the solute copolymer comprises interpolymerized monomer units of the crosslinking agent.

6. The composition of claim 4 wherein the solvent monomer component contains the crosslinking agent.

7. The syrup polymer composition of claim 4 comprising:
   a) first component solute copolymer comprising:
      i. 85 to 99.5 parts by weight of an (meth)acrylic acid ester monomer units;
      ii. 0.5 to 15 parts by weight of an acid functional monomer units;
      iii. 0 to 20 parts by weight of a non-acid functional, ethylenically unsaturated polar monomer units;
      iv. 0 to 5 parts by weight of a vinyl monomer units,
      v. 0 to 5 parts by weight of a monomer units of the crosslinking agent;
      wherein the sum is 100 parts by weight; and
   b) a second component comprising at least one free-radically polymerizable solvent monomer and optional the crosslinking agent, and
   c) 0.1 to 10 parts by weight of the crosslinking agent in the solute copolymer and/or the solvent monomer component, relative to a) plus b).

8. A method of making an (meth)acrylate adhesive copolymer comprising
   a) partially polymerizing a (meth)acrylate monomer composition, said monomer mixture optionally containing a vinyl siloxane crosslinking agent having at least two vinyl groups to produce a syrup copolymer having a solute copolymer and solvent monomer,
   b) adding a vinyl siloxane crosslinking agent to the syrup copolymer composition of step a) if not initially present in the monomer mixture,
   c) further photopolymerizing the syrup polymer composition;
wherein the vinyl siloxane crosslinking agent is of the formula:

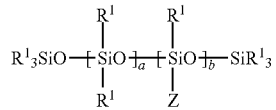

wherein Z is a vinyl group,
R$^1$ is a monovalent hydrocarbyl group;
a is 0 to 85
b is 2 to 30.

9. The method of claim 8 wherein the monomer mixture comprises:
   i. 85 to 99.5 parts by weight of an (meth)acrylic acid ester monomer units;
   ii. 0.5 to 15 parts by weight of an acid functional monomer units;

iii. 0 to 10 parts by weight of a non-acid functional, ethylenically unsaturated polar monomer units;
iv. 0 to 5 parts by weight of a vinyl monomer units,
v. 0 to 5 parts by weight of the crosslinking agent.

10. The method of claim 8 comprising 0.1 to 10 parts by weight of the vinyl siloxane crosslinking agent, relative to 100 parts by weight of monomer.

11. A polymerizable solution comprising:
i. 85 to 99.5 parts by weight of an (meth)acrylic acid ester;
ii. 0.5 to 15 parts by weight of an acid functional monomer;
iii. 0 to 20 parts by weight of a non-acid functional, ethylenically unsaturated polar monomer;
iv. 0 to 5 parts by weight of a vinyl monomer, wherein the sum of i to iv is 100 parts by weight
v. 0.1 to 10 parts by weight of the vinyl siloxane crosslinking agent, relative to 100 parts by weight of i to iv;
b) a solvent, and
c) an initiator;
wherein the vinyl siloxane crosslinking agent is of the formula:

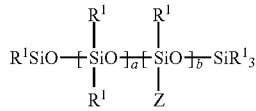

wherein Z is a vinyl group,
$R^1$ is a monovalent hydrocarbyl group;
a is 0 to 85
b is 2 to 30.

12. A pressure-sensitive adhesive composition comprising (meth)acrylate copolymer crosslinked by a vinyl siloxane crosslinking agent having at least two vinyl groups;

wherein the copolymer is of the formula:

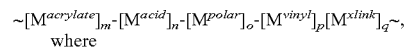

$[M^{acrylate}]$ represents polymerized acrylate ester monomer units, where subscript m corresponds to 85 to 99.5 parts s by weight thereof;
$[M^{acid}]$ represents polymerized acid monomer units, where subscript n corresponds to 0.5 to 15 parts by weight thereof;
$[M^{polar}]$- represents polymerized non-acid functional polar monomer units, where subscript o corresponds to 0 to 20 parts by weight thereof;
$[M^{vinyl}]$ represents polymerized other monomer units, where subscript p corresponds to 0 to 5 parts by weight thereof; wherein the sum of n, m, o and p is 100 parts by weight; and
$[M^{xlink}]$ represents polymerized vinyl siloxane monomer units,
where subscript q is 0.1 to 10 parts, relative to 100 parts by weight of the sum of n, m, o and p;
wherein the vinyl siloxane crosslinking agent is of the formula:

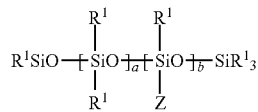

wherein Z is a vinyl group,
$R^1$ is a monovalent hydrocarbyl group;
a is 0 to 85
b is 2 to 30.

* * * * *

UNITED STATES PATENT AND TRADEMARK OFFICE
CERTIFICATE OF CORRECTION

PATENT NO. : 10,100,237 B2
APPLICATION NO. : 15/326696
DATED : October 16, 2018
INVENTOR(S) : Corinne Lipscomb et al.

Page 1 of 2

It is certified that error appears in the above-identified patent and that said Letters Patent is hereby corrected as shown below:

In the Specification

Column 7,
Lines 2-6, delete "  " and insert -- 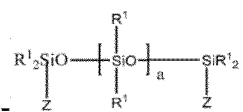 --, therefor.

Column 7,
Lines 7-11, delete " 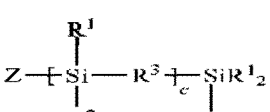 " and insert -- 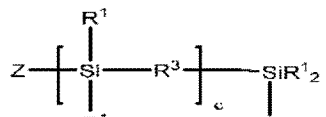 --, therefor.

Column 7,
Line 60, delete "1" and insert -- I --, therefor.

Column 8,
Lines 19 & 20, delete "O)mSiMePhCH" and insert -- O)$_m$SiMePhCH --, therefor.

Column 12,
Line 41, delete "[M$^{polar}$]-represents" and insert -- [M$^{polar}$]- represents --, therefor.

Column 21,
Line 41, delete "R$_1$" and insert -- R$^1$ --, therefor.

Signed and Sealed this
Eleventh Day of December, 2018

Andrei Iancu
*Director of the United States Patent and Trademark Office*

CERTIFICATE OF CORRECTION (continued)
U.S. Pat. No. 10,100,237 B2

Column 22,

Lines 18-23, delete " 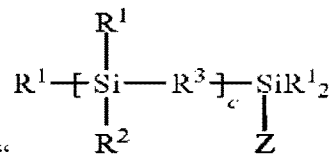 " and insert -- 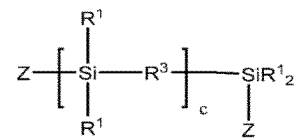 --, therefor.

Column 23,

Lines 1-5, delete " 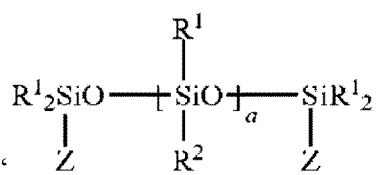 " and insert -- 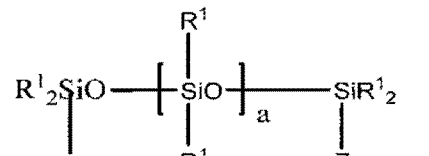 --, therefor.

In the Claims

Column 29,

Lines 23-27, in Claim 11, delete " 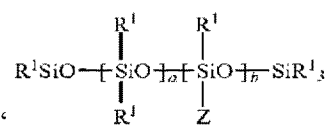 " and insert -- 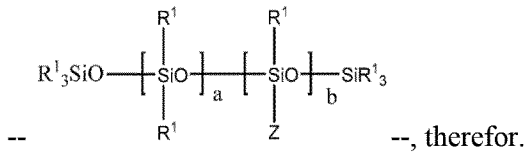 --, therefor.

Column 30,

Lines 25-29, in Claim 12, delete " 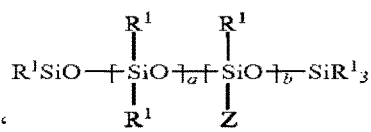 " and insert -- 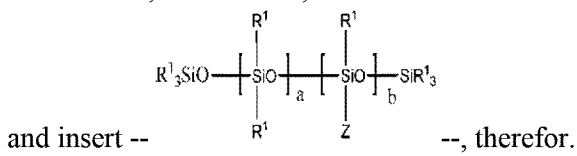 --, therefor.